United States Patent
Yakovenko et al.

(10) Patent No.: US 6,774,966 B1
(45) Date of Patent: Aug. 10, 2004

(54) LIQUID CRYSTAL DISPLAY WITH WIDE VIEWING ANGLE AND METHOD FOR MAKING IT

(75) Inventors: Sergey E Yakovenko, Minsk (BY); Anatoly A Minko, Minsk (BY); Victor A Konovalov, Minsk (BY); Anatoly A Muravsky, Minsk (BY)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/446,330

(22) PCT Filed: Apr. 21, 1998

(86) PCT No.: PCT/BY98/00004
§ 371 (c)(1),
(2), (4) Date: Mar. 23, 2000

(87) PCT Pub. No.: WO98/57222
PCT Pub. Date: Dec. 17, 1998

(30) Foreign Application Priority Data

Jun. 10, 1997 (BY) .................................................. 970314

(51) Int. Cl.$^7$ ................................................. G02F 1/13
(52) U.S. Cl. ........................................ 349/129; 349/130
(58) Field of Search ............................... 349/129, 130

(56) References Cited

U.S. PATENT DOCUMENTS

| | | | |
|---|---|---|---|
| 3,807,831 A | * | 4/1974 | Soref ......................... 349/141 |
| 3,914,022 A | | 10/1975 | Kashnow |
| 4,581,608 A | | 4/1986 | Aftergut et al. |
| 4,701,028 A | | 10/1987 | Clerc et al. |
| 4,728,175 A | | 3/1988 | Baron |
| 4,786,147 A | | 11/1988 | Clerc et al. |
| 4,889,412 A | | 12/1989 | Clerc et al. |
| 4,937,566 A | | 6/1990 | Clerc |
| 4,978,203 A | | 12/1990 | Yamazaki et al. |
| 5,039,185 A | | 8/1991 | Uchida et al. |
| 5,093,741 A | | 3/1992 | Shohara et al. |
| 5,182,664 A | | 1/1993 | Clerc |
| 5,229,873 A | | 7/1993 | Hirose et al. |
| 5,249,070 A | | 9/1993 | Takano ......................... 359/54 |
| 5,309,264 A | | 5/1994 | Lien et al. ..................... 359/87 |
| 5,339,181 A | | 8/1994 | Kim et al. |

(List continued on next page.)

FOREIGN PATENT DOCUMENTS

| | | |
|---|---|---|
| EP | 0 752 611 A2 | 1/1997 |
| EP | 0 814 142 A2 | 12/1997 |
| EP | 0 854 377 A2 | 7/1998 |

(List continued on next page.)

OTHER PUBLICATIONS

*SID 93 Digest*, 19.2 "Two–Domain TN–LCDs Fabricated by Parallel Fringe Field Method," by A. Lien and R.A. John, IBM T.J. Watson Research Center, Yorktown Heights, NY., pp. 269–272.

(List continued on next page.)

*Primary Examiner*—James A. Dudek
(74) *Attorney, Agent, or Firm*—McKenna Long & Aldridge LLP

(57) ABSTRACT

The present invention relates generally to the field of electronics and may be used for making displays and, in particular, liquid crystal information displays, panels, cells, etc. The object of the invention is to simplify the method for making liquid crystal devices by reducing the number of technological operations and consequently to reduce the cost of liquid crystal display without sacrificing the quality (wide viewing angle). To achieve this the electric field applied to the liquid crystal in such display has the non-uniform component parallel to the plane of the substrates (1), which leads to the non-uniform reorientation of the aforementioned liquid crystal (5) in the space between the aforementioned electrodes (2, 3) within the pixel area and hence improves optical properties of this display in various directions of observation.

13 Claims, 8 Drawing Sheets

U.S. PATENT DOCUMENTS

| | | | | |
|---|---|---|---|---|
| 5,434,690 | A | * 7/1995 | Hisatake et al. | 349/8 |
| 5,477,358 | A | 12/1995 | Rosenblatt et al. | |
| 5,517,341 | A | 5/1996 | Kim et al. | |
| 5,517,342 | A | 5/1996 | Kim et al. | |
| 5,574,582 | A | 11/1996 | Takeda et al. | |
| 5,602,662 | A | 2/1997 | Rosenblatt et al. | |
| 5,608,556 | A | 3/1997 | Koma | |
| 5,621,558 | A | 4/1997 | Shimada et al. | |
| 5,623,354 | A | 4/1997 | Lien et al. | |
| 5,666,179 | A | 9/1997 | Koma | |
| 5,668,650 | A | 9/1997 | Mori et al. | |
| 5,673,092 | A | 9/1997 | Horie et al. | |
| 5,686,977 | A | 11/1997 | Kim et al. | |
| 5,737,051 | A | 4/1998 | Kondo et al. | |
| 5,748,275 | A | * 5/1998 | Sato et al. | 349/144 |
| 5,767,926 | A | 6/1998 | Kim et al. | |
| 5,777,701 | A | 7/1998 | Zhang | |
| 5,777,711 | A | 7/1998 | Sugiyama | |

FOREIGN PATENT DOCUMENTS

| | | |
|---|---|---|
| EP | 0 884 626 A2 | 12/1998 |
| GB | 2 296 810 A | 7/1996 |
| GB | 2 321 718 A | 8/1998 |
| GB | 2 337 843 A | 12/1999 |
| JP | 02-294622 | 12/1990 |
| JP | 03-261914 | 11/1991 |
| JP | 04-067127 | 3/1992 |
| JP | 04-261522 | 9/1992 |
| JP | 05-002161 | 1/1993 |
| JP | 05-297412 | 11/1993 |
| JP | 06-194656 | 7/1994 |
| JP | 06-194657 | 7/1994 |
| JP | 06-258649 | 9/1994 |
| JP | 06-273798 | 9/1994 |
| JP | 06-281959 | 10/1994 |
| JP | 06-301036 | 10/1994 |
| JP | 06-347824 | 12/1994 |
| JP | 07-013164 | 1/1995 |
| JP | 07-013166 | 1/1995 |
| JP | 07-028063 | 1/1995 |
| JP | 07-036044 | 2/1995 |
| JP | 07-043698 | 2/1995 |
| JP | 07-043719 | 2/1995 |
| JP | 07-064089 | 3/1995 |
| JP | 07-181493 | 7/1995 |
| JP | 07-199190 | 8/1995 |
| JP | 07-230097 | 8/1995 |
| JP | 07-311383 | 11/1995 |
| JP | 08-022023 | 1/1996 |
| JP | 08-076125 | 3/1996 |
| JP | 08-101399 | 4/1996 |
| JP | 08-146468 | 6/1996 |
| JP | 08-220511 | 8/1996 |
| JP | 08-220524 | 8/1996 |
| JP | 08-313915 | 11/1996 |
| JP | 09-022025 | 1/1997 |
| JP | 09-033890 | 2/1997 |
| JP | 09-152583 | 6/1997 |
| JP | 09-197420 | 7/1997 |
| JP | 09-230360 | 9/1997 |
| JP | 09-230387 | 9/1997 |
| JP | 09-236821 | 9/1997 |
| JP | 09-325373 | 12/1997 |
| JP | 10-301112 | 11/1998 |
| JP | 10-333180 | 12/1998 |
| JP | 11-109355 | 4/1999 |
| JP | 11-109356 | 4/1999 |
| JP | 11-109358 | 4/1999 |
| JP | 11-109362 | 4/1999 |
| JP | 11-109391 | 4/1999 |
| JP | 11-119198 | 4/1999 |
| JP | 11-119209 | 4/1999 |
| JP | 11-148078 | 6/1999 |
| JP | 11-149076 | 6/1999 |
| JP | 11-149079 | 6/1999 |
| JP | 11-149093 | 6/1999 |
| JP | 11-223807 | 8/1999 |
| JP | 11-223808 | 8/1999 |

OTHER PUBLICATIONS

SID 94 Digest, P45: "TFT–Addressed Two–Domain TN VGA Displays Fabricated Using the Parallel–Fringe–Field Method," by A. Lien, R.A. John, IBM T.J. Watson Research Center, Yorktown Heights, NY, pp. 594–597.

SID 95 Digest, 41.2 "No–Rub Multi–Domain TFT–LCD Using Surrounding–Electrode Method," by N. Koma, Y. Baba and K. Matsuoka, Sanyo Electric Co., Ltd., Gifu, Japan, pp. 869–872.

Euro Display '96, "Novel high contrast random and controlled 4–domain CTN–LCDs with wide viewing angle," by H. Murai, M. Suzuki and S. Kaneko, NEC Corp., Kawasaki, Japan, pp. 159–161.

IDW '97, "A Vertically Aligned LCD Providing Super–High Image Quality," by Y. Koike, S. Kataoka, T. Sasaki, H. Chida, H. Tsuda, A. Takeda and K. Ohmuro, Fujitsu Limited, pp. 159–162.

SID 97 Digest, P–1 "Development of a High–Quality TFT–LCD for Projection Displays," N. Koma and R. Nishikawa, Sanyo Electric Co., Ltd., Gifu, Japan, pp. 461–464.

SID 97 Digest, 33.3 "Development of Super–High–Image–Quality Vertical–Alignment–Mode LCD," by K. Ohmuro, S. Kataoka, T. Sasaki and Y. Koike, Fujitsu Ltd., Atsugi, Japan, pp. 845–848.

S.T. Wu, C.S. Wu, "High–Brightness Projection Displays Using Mixed–Mode Twisted–Nematic Liquid–Crystal Cells," SID Digest 27, 32.1, 763–766 (1996)–1.

N. Yamagishi, H. Watanabe, K. Yokoyama, "Wide Viewing Angle LCD Using Retardation Films," Japan Display 89', P2–10, 316–319 (1989)–2.

M. Schadt, "Invited Paper: Optical Patterning of Multidomain LCDs," Proc. SID '97, 24.1, 397–400 (1997)–3.

J. Chen et al., "Optimum Film Compensation Modes for TN and VA LCDs," SID '98 Digest, 21–2, 1085–1088 (1998)–4.

M. Ohta et al., Development of Super–TFT–LCDs with In–Plane Switching Display Mode, Asia Display '95, S30–2, 707–710 (1995)–5.

A.Lien, et al., "Ridge and Fringe–Field Multi–Domain Homeotropic LCD," SID 98 Digest, 44.1L, 1123–1126 (1998)–7.

A. Takeda et al., "A Super–High Image Quality Multi–Domain Vertical Alignment LCD by New Rubbing–Less Technology," SID 98 Digest, 41.1, 1077–1080 (1998)–8.

SID 97 Digest, 24.1 "Invited Paper: Optical Patterning of Multidomain LCDs," M. Schadt and H. Seiberle, Rolic Ltd., Basel, Switzerland, pp.397–400.

Japan Display, P2–10 "Wide Viewing Angle LCD Using Retardation Films," N. Yamagishi, H. Watanabe and K. Yokoyama, Matsushita Electric Industrial Co. Ltd., Osaka, pp.316–319.

SID 98 Digest, 41.3 "New LCD Modes for Wide–Viewing Angle Applications," K.–H. Kim, S.–B. Park, J.–U. Shim and J. –H. Souk, Samsung Electronics, Kyungki–Do, Korea, J.Chen, Liquid Crystal Institute, Kent State University, Kent, OH, pp.1085–1088

SID 98 Digest, 41.1 "A Super–High–Image–Quality Multi–Domain Vertical Alignment LCD by New Rubbing–Less Technology," A. Takeda, S. Kataoka, T. Sasaki, H. Chida, H. Tsuda, K. Ohmuro and Y. Koike, Fujitsu Ltd., Atugi, Japan, T. Sasabayashi and K. Okamotoa Fujitsu, Ltd., Kawasaki, Japan, pp. 1077–1080.

Asia Display 95, S30–2 "Development of Super–TFT–LCDs with In–Plane Switching Display Mode," M. Ohta, M. Oh–e and K. Kondo, Electron Tube & Devices Div., Hitachi, Ltd., Mobara, Japan, Hitachi Res. Lab., Hitachi, Ltd., Hitachi, Japan, pp.707–710.

SID 96 Digest, 32.1 High–Brightness Projection Displays Using Mixed–Mode Twisted–Nematic Liquid–Crystal Cells, S.–T. Wu and C.–S. Wu, Hughes Research Laboratories, Malibu, CA pp. 763–766.

SID 98 Digest, 44.1 "Ridge and Fringe–Field Multi–Domain Homeotropic LCD," A. Lien, R. Nunes, R. A. John, E. Galligan, E. Colgan and J. Wilson, IBM T. J. Watson Research Center, Yorktown Heights, NY, C. Cai, Polytechnic University, Brooklyn, NY, pp.1123–1126.

SID 98 Digest, 44.2L "Multi–Domain Vertically Aligned Mode," V. A. Konovalov, A. A. Muravski, C. N. Timofeev and S. Ye Yakovenko, Institute of Applied Physics Problems, Minsk, Belarus, pp.1127–1130.

* cited by examiner

LIQUID CRYSTAL DISPLAY WITH WIDE VIEWING ANGLE AND METHOD FOR MAKING IT

FIELD OF THE INVENTION

The present invention relates generally to the field of electronics and may be used for making displays and, in particular, liquid crystal information displays, panels, cells etc.

PRIOR ART

The methods for making liquid crystal displays are known [I. C. Khoo, S. T. Wu, Optics and nonlinear optics of liquid crystals (World Scietific, London) 1993, 390p.-1]. Basically, they consist of depositing on two flat substrates electrical conductive and planar alignment layers and filling the space between the substrates with liquid crystal with positive dielectric anisotropy. Orientation of the liquid crystal is gradually twisted to 90° in the plane of the substrates. Polarization of the light passing such display is similarly twisted and in crossed polaroids it transmits light By applying electric field to the electrodes optical axis of the liquid crystal is reoriented perpendicular to the electrodes and such device does not rotate more the light polarization. Due to this in crossed polaroids such device does not transit light. A set of bright and dark elements makes any picture, half-tone picture as well, because the degree of light transmission gradually depends on the value of the applied voltage.

There are also known liquid crystal devices and methods for making them, as that one described in [S. T. Wu, C. S. Wu, SID Digest 27, 763 (1996)-2]. According to it a chiral liquid crystal with negative dielectric anisotropy is placed between the substrates supplied with electrically conductive electrodes and homeotropically aligning coatings. In crossed polaroids such device does not transmit the light. Under applied electric field optical axis of the liquid crystal tends to orient perpendicular to the electric field in the whole space between the substrates. Given the chirality of the liquid crystal is such that the pitch of its spontaneous twist equals for times the liquid crystal thickness, then under the electric field the liquid crystal spontaneously twists to 90°. In the vicinity of the substrates orientation of the liquid crystal is which is caused either by the anisotropy of the design, or by the residual anisotropy of the homeotropically aligning coating. With polaroids oriented parallel to the liquid crystal optical axis close to the adjacent substrate (and consequently perpendicularly to each other) one can provide such conditions, when polarization of the light follows the liquid crystal orientation. With electric field applied, such device transmits light, the amount of which may be gradually reduced by decreasing the applied voltage.

The drawback of this device, as well as of that one described in [1], is strong dependence of its transmission on the incidence angle of light. As a consequence, at some observation angles strong decrease of the contrast and even its inversion are observed.

According to the technical reference, which is the closest to the proposed one from the point of view of its technical content, to reduce this undesirable phenomenon the known method [1] is modified so, that the area of each pixel consists of domains with various possible orientation of the liquid crystal in the plane of the substrates [M.Schadt, Proc.SID'97, 24.1 (1997).-3]. This is achieved by depositing photocured polymer coating with the subsequent irradiation of different domains of a pixel with ultraviolet light of various polarization (applying multiple photolithography with precise alignment). Liquid crystal alignment at the surface of such coating is determined by the polarization of the polymerizing radiation and therefore is different in different domains of a pixel. In such a case, light transmission of each pixel is the sum of the transmissions of domains with different orientation of the liquid crystal and therefore does not depend on the azimuthal viewing angle. This also eliminates inversion of the intermediate transmission levels. Complexity and high cost (due to multiple photolithography) are the drawbacks of this Technical reference.

Another device is commonly used. [N.Yamagishi, H.Watanabe, K.Yokoyama, 'Japan Display 89', 316 (1989)-4], according to which the viewing angle of liquid crystal devices is improved by using special retardation films between the liquid crystal layer and polaroids. Unfortunately, this increases the cost of such devices.

SUMMARY OF THE INVENTION

The object of invention is to simplify the method for making liquid crystal devices by reducing the number of technological operations and consequently to reduce the cost of liquid crystal display without sacrificing the quality (wide viewing angle).

To achieve this, the electric field applied to the liquid crystal in such display has the non-uniform component parallel to the plane of the substrates, which leads to the non-uniform reorientation of the aforementioned liquid crystal in the space between the aforementioned electrodes within the pixel area and hence improves optical properties of this display in various directions of observation.

According to the method electrically conducting and homeotropically aligning layers are deposited on the surfaces of two flat substrates, faced to each other and fill the space between these substrates with the liquid crystal possessing negative dielectric anisotropy. Without electric field the liquid crystal molecules are orthogonal to the substrates and this device does not transmit light in crossed polaroids. Under electric field liquid crystal reorients perpendicular to the electric field not uniformly across the pixel area, but according to the direction of the in-plane component of the electric field. In this way the domains with different (including opposite) orientation of liquid crystal are formed. At various viewing angles different domains have different transmission levels and transmittance of the whole pixel equals to some averaged value. Due to this the phenomenon of inversion of levels with intermediate transmission is reduced for all observation angles, as this takes place in the known device [3].

One can also use non-chiral as well as chiral liquid crystal. In the first case, light transmittance of the liquid crystal between crossed polaroids planarly aligned by the electric field is caused only by birefringence of the liquid crystal. To maximize transmittance under electric field one should align polaroids at 45° to the optical axis of the liquid crystal and the doubled product of the liquid crystal thickness by its birefringence should be equal to the odd number of the light wavelengths. There are four possible variants of such orientation of the liquid crystal and the case, when all four kinds of these domains occupy similar area, meets the requirements of this invention best of all. Due to decrease of the light transmittance with the deviations of the liquid crystal from optimal orientation, the maximal transmittance value can be achieved when under electric field the liquid crystal forms domains with uniform orientation of the liquid crystal within the domain area, the aforementioned orientation having 45° angle with the polaroids direction.

Transmittance of the twisted nematic liquid crystal structure between crossed polaroids depends on the orientation of the liquid crystal axis in their vicinity relative to the polaroids axes. In the case they coincide and the product of the liquid crystal thickness by its birefringence exceeds the light wavelength, polarization of the transmitted light follows the liquid crystal twist. This ensures maximal transmittance of the known device fabricated according to the known method [3] under electric field provided this electric field exceeds the threshold value for the particular liquid crystal. In the proposed device fabricated according to the proposed method the liquid crystal can have various orientation of its optical axis under electric field and to achieve maximal transmittance one should have the product of the liquid crystal thickness by its birefringence equal to the integer number of the light wavelengths. In this case polarization of the light passing the liquid crystal is also twisted to 90° and practically 100% of light are transmitted by the second polaroid.

The aforementioned requirements to the liquid crystal thickness are valid when both substrates and both electrodes are transparent and the device according the invention is used to display image with the transmitted light. In the case the device according the invention is used in reflection mode, one of the aforementioned substrates and the electrode deposited on it are made non-transparent (reflective) and for displaying image only one polaroid is used. In this case the preferred orientation (twisted, or not; configuration of domains) and thickness of the liquid crystal in various areas may be calculated with the methods [D. W. Berreman, Appl.Phys.Letters, 35, 12 (1974)-5] known for homogeneously aligned nematic structures. To increase the contrast one may combine the proposed method with the known one [4] in which retardation films are used. According to the proposed method one may introduce dichroic dyes in the liquid crystal filling the gap between the substrates and then such device may display images without polaroids but due to the light absorption by the dye molecules. The aforementioned dye may have dichroic ratio larger than one or smaller and the aforementioned liquid crystal may be both chiral or non-chiral.

There are various methods to create in-plane with the electrodes component of the electric field, when it is applied to the liquid crystal. For example, this can be achieved by special patterning of the electrodes surrounding the liquid crystal, or by displacing dielectric particles by deposing special dielectric films being reliefed as on the liquid crystal side so on the substrate side, said particles divide the pixel into parts with different orientation of the electric field. Even the pixel edges themselves cause the non-uniformity of the electric field in the vicinity of the pixel boarders and therefore they also may be used for this purpose. Essential is to create such conditions that electric field applied to the liquid crystal has parallel to the substrates components, these components have different direction i.e. different azimuth angle in different pixel areas.

DETAILED DESCRIPTION OF THE INVENTION

According to the proposed method we made liquid crystal display. For this, at the glass substrates 1 0.5–2 mm thick and with linear dimensions from 1 cm to several decimeters we deposited by vacuum sputtering column 2 and row 3 transparent electrodes 70–150 nm thick, made of indium-tin oxide with the surface resistivity 20–2000 Ohm/□. The electrodes were patterned photolithographically. At the same surfaces homeotropically aligning coating 4, such as lecithin, with the thickness 20–80 nm was spinned and baked. The substrates were overlaid with the aligning layers faced to each other, sealed with the glue based on epoxy resin and the gap was filled with the liquid crystal with negative dielectric anisotropy. The conditions for appearing the component of the electric field parallel to the substrates, when this electric field is applied through the electrodes 2 and 3 to the liquid crystal, were created by one of the methods described below.

Figure 3:
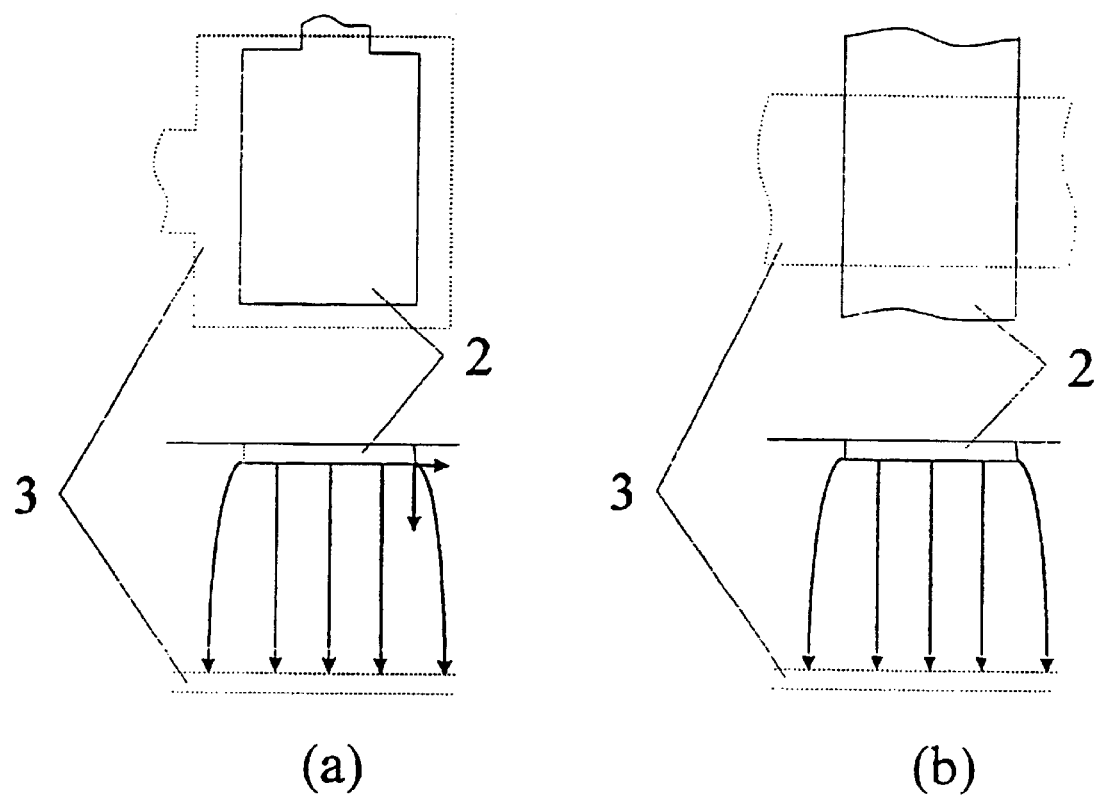
In FIG. 3 the top view and the cross-section of the electrodes pattern are shown schematically for the segment-type (a) and the matrix-type (b) liquid crystal devices. The arrows show the force lines of the electric field. The component of the electric field parallel to the substrates is shown at the edges of the electrodes.
Figure 4:
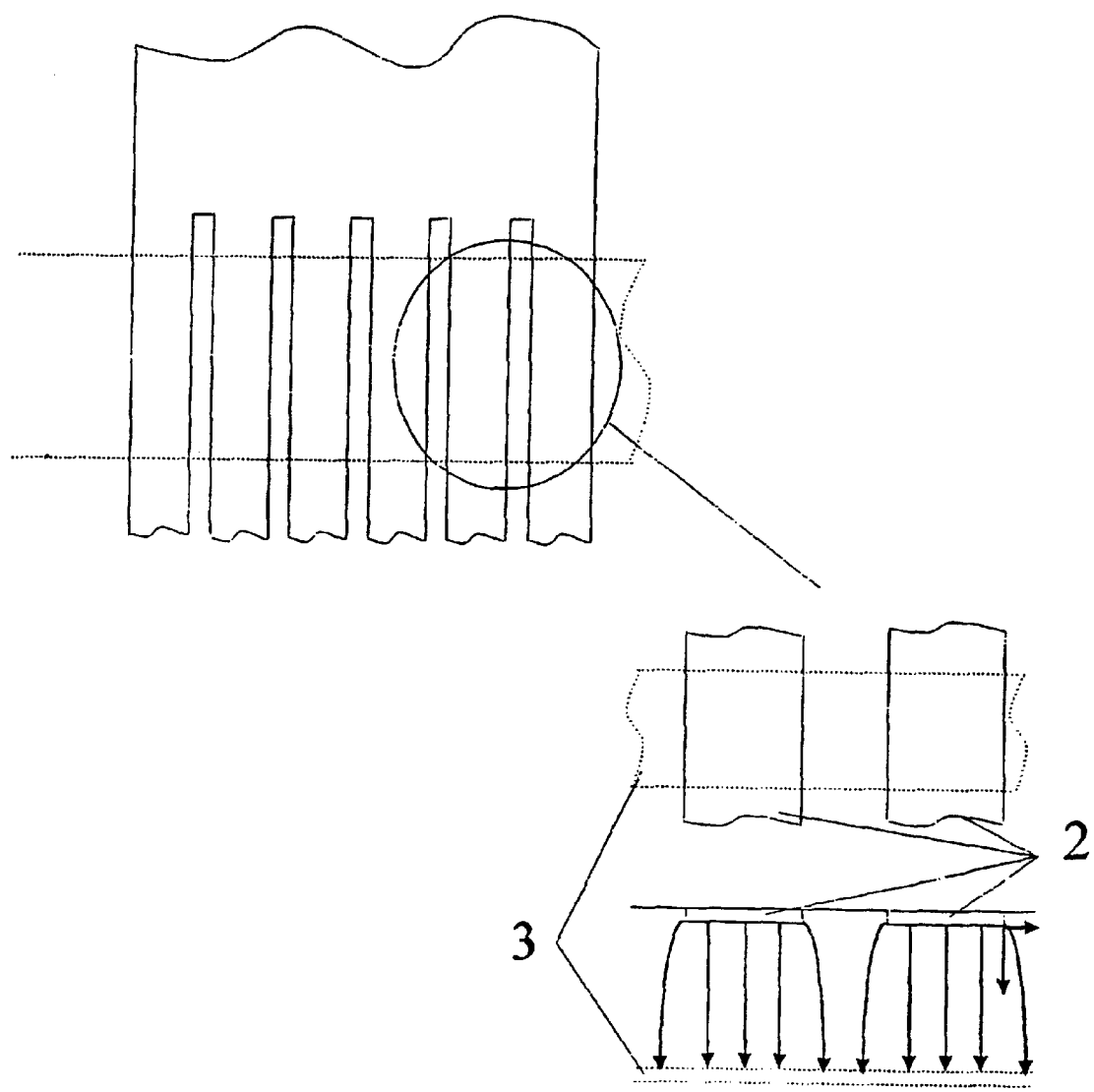
FIG. 4 schematically shows the top view and the cross-section of the electrodes. The arrows show the force lines of the electric field. The component of the electric field parallel to the substrates is shown arising at the slits in the electrodes.
Figure 5:
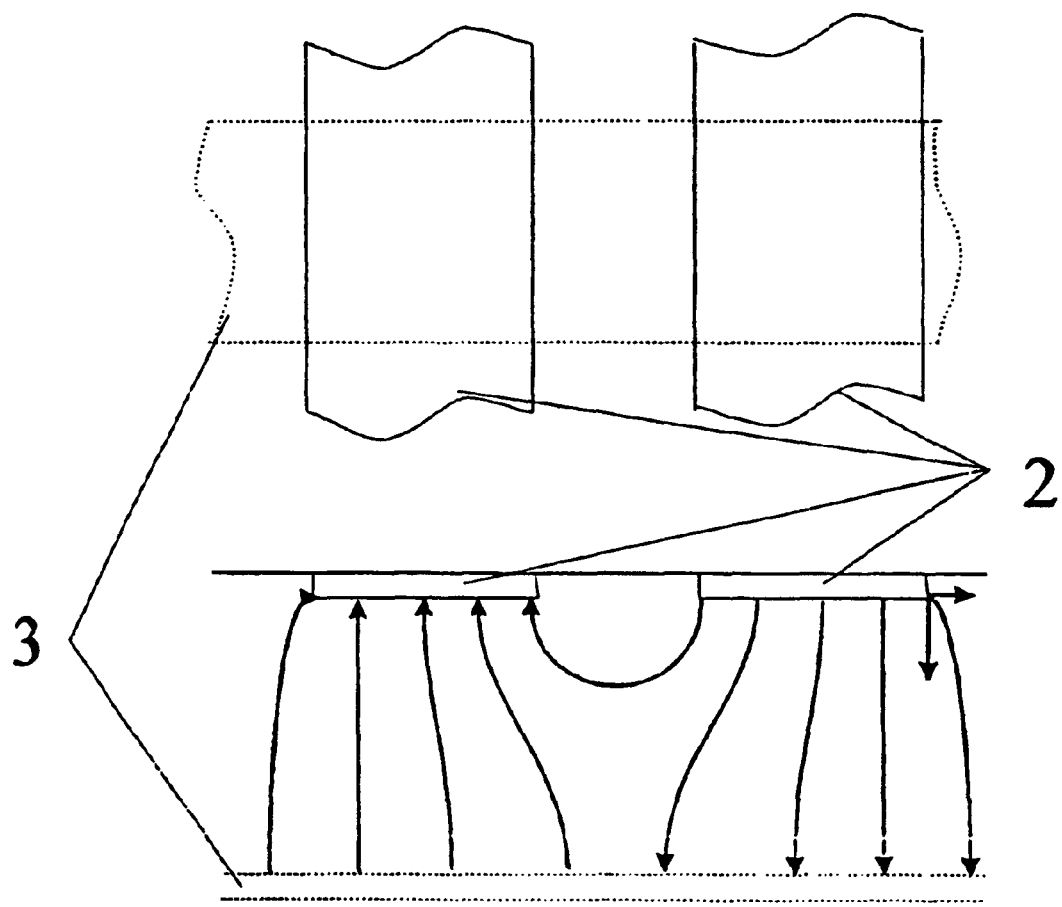
FIG. 5 schematically shows the top view and the cross-section of the electrodes. The arrows show the force lines of the electric field. The component of the electric field parallel to the substrates is shown arising when different polarity is applied to the electrodes comprising the same pixel.
Figure 6:
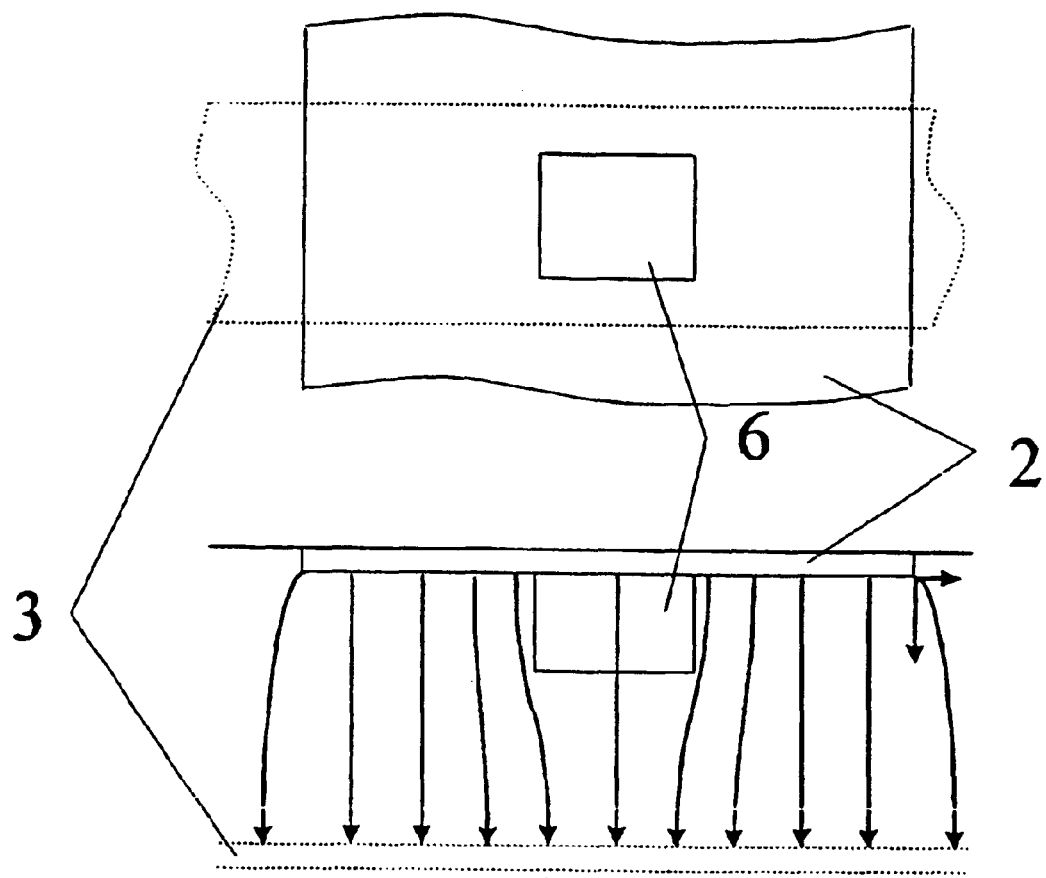
FIG. 6 schematically shows the top view and the cross-section of the electrodes. The arrows show the force lines of the electric field. The component of the electric field parallel to the substrates is shown arising around the additional dielectric particle with the dielectric permittivity different from that of the liquid crystal.

Conditions for appearing the parallel to the substrates component of the electric field can be created in various ways. The opposite electrodes in the segment-type liquid crystal device can be made of different dimensions, as it is shown, for example, in FIG. 3. Then, at the edges of the segment, electric field is orthogonal to the substrates not in the entire space between the electrodes (FIG. 3a). In the matrix-type liquid crystal device (FIG. 3b) electric field inevitably has the component parallel to the substrates and in the case the width of the electrodes 2 and/or 3 is comparable (not more than 3–5 time exceeds) the thickness of the liquid crystal layer, this component is sufficient for dividing the pixel into even parts with different orientation of the liquid crystal. In the cases, when the pixels should be of larger dimensions (should exceed the liquid crystal thickness many times) big number of domains with the electric field substantially non-orthogonal to the substrates can be obtained by dividing the electrodes into the parts, as it is shown in FIG. 4. Even stronger horizontal component of the electric field can be obtained if even and odd parts of the dectrode are connected to the electric field sources of the opposite polarity, as it is shown in FIG. 5. Alternatively, big number of domains with the electric field substantially non-orthogonal to the substrates can be obtained by displacing between the electrodes at the opposite substrates a big number of particles with the dielectric permittivity essentially different from that of the liquid crystal (FIG. 6). It can be realized by deposing special dielectric films being releafed as on liquid crystal side so on the substrate side.

Figure 1:
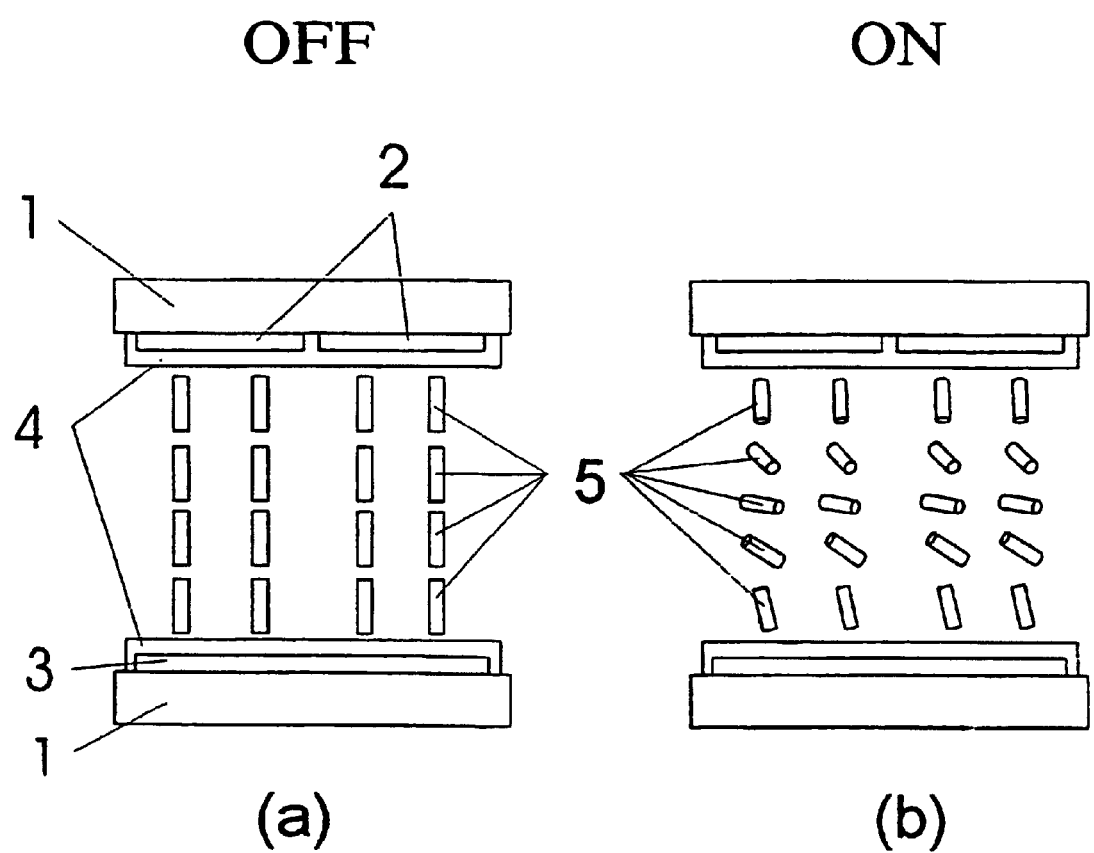
FIG. 1 displays the cross-section of the liquid crystal display according to [2] in the state without (a) and with (b) the electric field applied to the liquid crystal. The display consists of the glass substrates 1 with the column 2 and row 3 electrodes deposited on them and homeotropically aligning coating 4. Liquid crystal 5, the molecules of which are shown as cylinders, is placed between the glass substrates 1.
Figure 2:
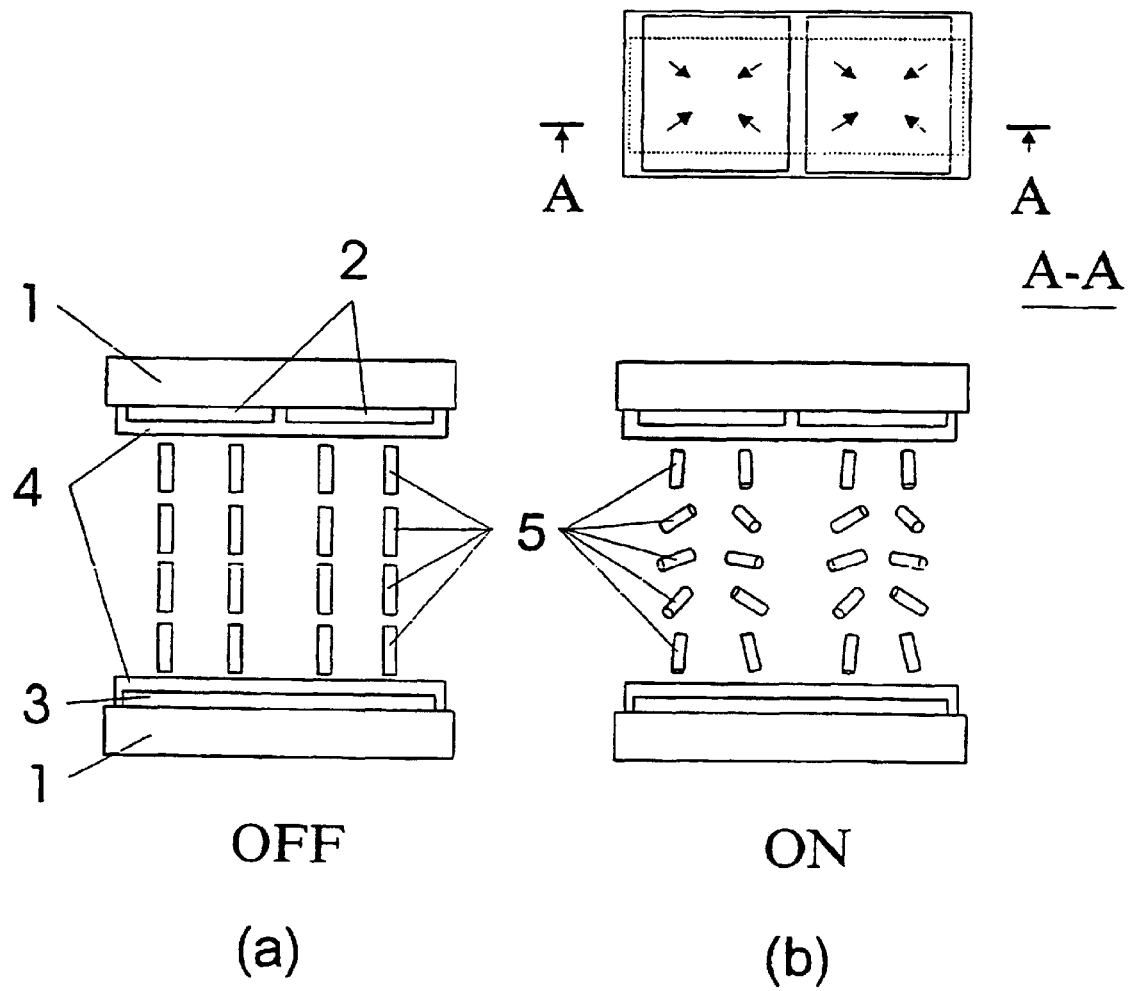
In FIG. 2 the top view and the cross-section of the liquid crystal device according the invention is shown in the state without (a) and with (b) the electric field applied to the liquid crystal. Liquid crystal 5, the molecules of which are shown as cylinders, is placed between the glass substrates 1 with the column 2 and row 3 electrodes deposited on them and homeotropically aligning coating 4. Different columns of cylinders correspond to the domains with different orientation of the liquid crystal (rotated to about 150 degrees in the plane of the substrates 1). The arrows show orientation of the liquid crystal in the central plane of the device.
Figure 7:
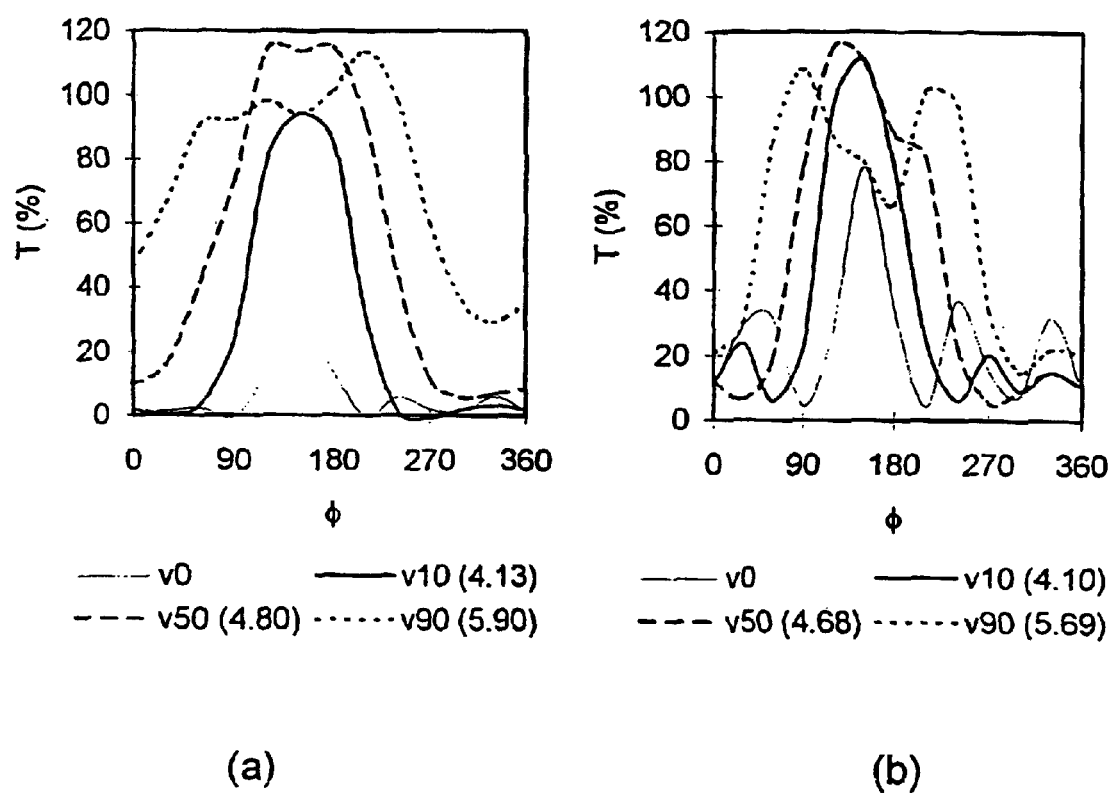
In FIG. 7 the light transmittance of the device made according to the known method [2] is displayed as a function of azimuth angle for the polar viewing angle equal 30 (a) and 50 (b) degrees. Different curves correspond to different levels of the applied electric field (its amplitude in Volts is shown in the brackets).
Figure 8:
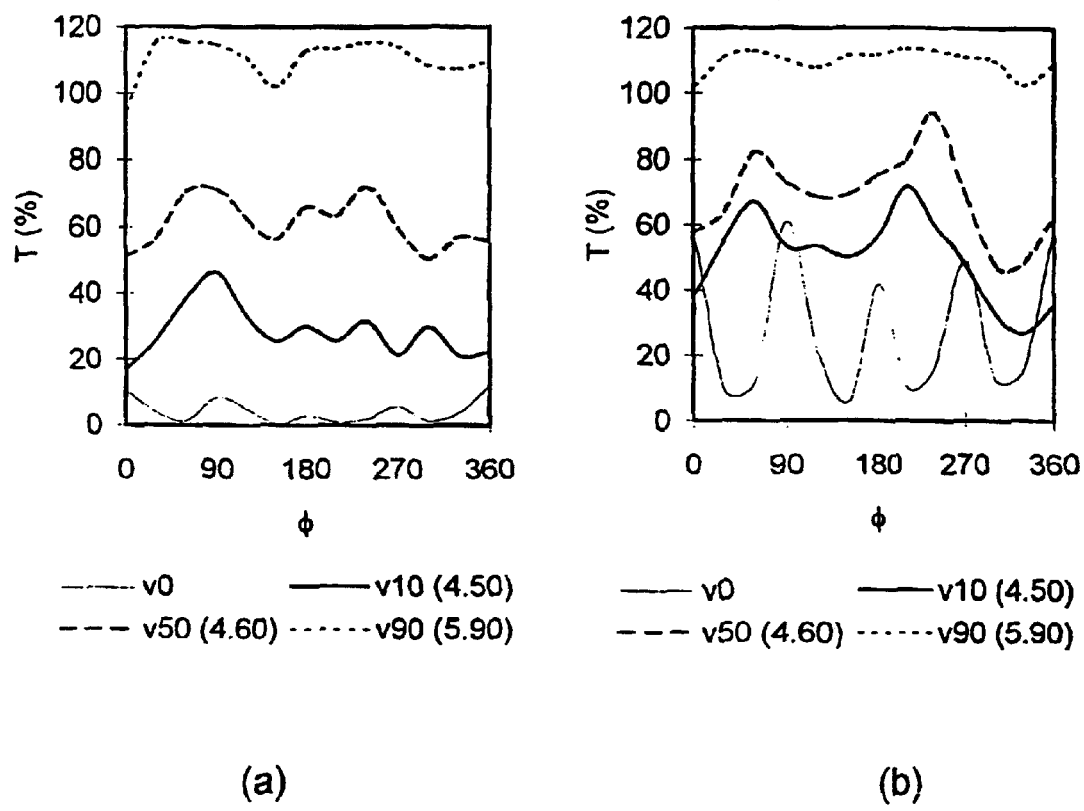
In FIG. 8 the light transmittance of the device according the invention is displayed as a function of azimuth angle for the polar viewing angle equal 30 (a) and 50 (b) degrees. Different curves correspond to different levels of the applied electric field (its amplitude in Volts is shown in the brackets).

The device according the invention operates as follows. In the state without the electric field the aligning coating 4 aligns the liquid crystal molecules perpendicular to the substrates 1. In this state the liquid crystal does not influence the polarization of the light passing it and in the crossed polaroids transmittance of the liquid crystal device equals zero. When electric field exceeding the threshold for the particular liquid crystal is applied to the transparent electrodes 2 and 3, the liquid crystal molecules tend to reorient perpendicular to the field. The liquid crystal begins to change polarization of the light passing it and transmittance of the liquid crystal device becomes different from zero. Existence of the component of the electric field which is parallel to the substrates and non-uniformly oriented within the pixel area makes the molecules to decline from the normal to the substrates 1 in different directions (FIG. 2) in difference to what happens in the known device (FIG. 1). At various viewing angles different domains have different transmittance and the transmittance of the whole pixel equals to some averaged value. Due to this, opposite to the transmittance of the device made without creating conditions for non-uniform reorientation of the liquid crystal under electric field (FIG. 7), inversion of the transmittance levels of the liquid crystal display is reduced for all viewing angles (FIG. 8).

Tests of the proposed method and the display made by it have evidenced smaller number of operations required to make a display in comparison to the nearest Prior Art method (multiple illuminations by the ultraviolet light with precise alignment of different photomasks are not required). Simultaneously, the display according the invention possesses similarly even angular dependence of the transmittance, high contrast and the absence of the inversion of the transmittance levels at oblique observation angles.

What is claimed is:

1. Liquid crystal display with wide viewing angle comprising nematic liquid crystal with negative dielectric anisotropy placed between flat parallel substrates supplied with conductive electrodes and homeotropic aligning layers, orientation of the said liquid crystal is made non-uniform within the pixel area by means of the parallel to the said substrates components of the electric field applied to the said electrodes, while the components themselves have various directions characterized in that odd and even sections of the at least one of the said electrodes been made sectional are connected to the electric field sources of the opposite polarity.

2. Display according to claim 1 characterized in that the said liquid crystal contains chiral dopant with such concentration that equilibrium pitch of the said liquid crystal equals four times the liquid crystal thickness and the product of the later by the liquid crystal birefringence is made equal to the integer number of the light wavelengths.

3. Display according to claim 1, characterized in that one of the said electrodes is made reflective.

4. A liquid crystal display device comprising:

first and second substrates, each of the first and second substrates having a transparent conductive layer; and a liquid crystal layer between the first and second substrates, wherein said liquid crystal display is an electrically controlled birefringence type and at least one transparent conductive layer has a first conductive portion and a second conductive portion, the second conductive portion being spaced from the first conductive portion the first portion and the second portion each corresponding to first and second electric fields, the first and second electric fields having opposite polarities.

5. A liquid crystal display device according to claim 4, further comprising an alignment layer over the transparent conductive layer.

6. A liquid crystal display device according to claim 5, wherein the alignment layer includes a homeotropic alignment layer.

7. A liquid crystal display device according to claim 4, wherein the liquid crystal layer includes a negative dielectric anisotropy liquid crystal.

8. A liquid crystal display device according to claim 4, wherein the liquid crystal display device is a multi-domain liquid crystal display device.

9. A liquid crystal display device comprising:

first and second substrates, each of the first and second substrates having a transparent conductive layer; and a liquid crystal layer between the first and second substrates, wherein said liquid crystal display is an electrically controlled birefringence type and at least one transparent conductive layer has a first conductive portion and a second conductive portion, the second conductive portion being spaced from the first conductive portion, the first conductive portion and the second conductive portion each correspond to first and second electric fields and each of the first and second conductive portions of the transparent conductive layer has an end portion, the end portion distorting a corresponding electric field, the first and second electric fields have opposite polarities.

10. A liquid crystal display device according to claim 9, further comprising an alignment layer over the transparent conductive layer.

11. A liquid crystal display device according to claim 10, wherein the alignment layer includes a homeotropic alignment layer.

12. A liquid crystal display device according to claim 9, wherein the liquid crystal layer includes a negative dielectric anisotropy liquid crystal.

13. A liquid crystal display device according to claim 9, wherein the liquid crystal display device is a multi-domain liquid crystal display device.

* * * * *